J. P. ATTAWAY.
WAGON LOADER.
APPLICATION FILED NOV. 20, 1912.
1,066,977.
Patented July 8, 1913.
2 SHEETS—SHEET 1.
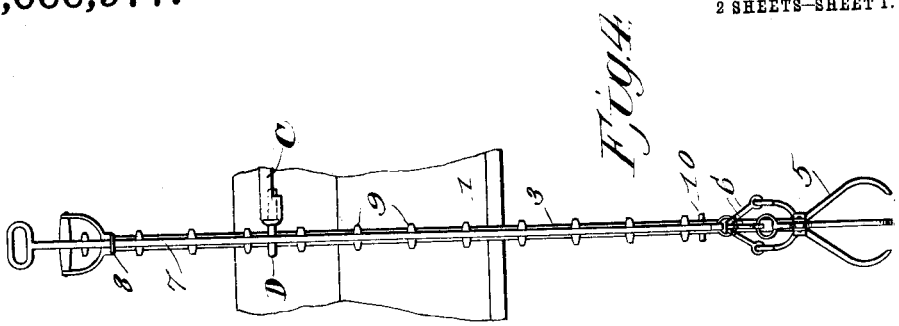
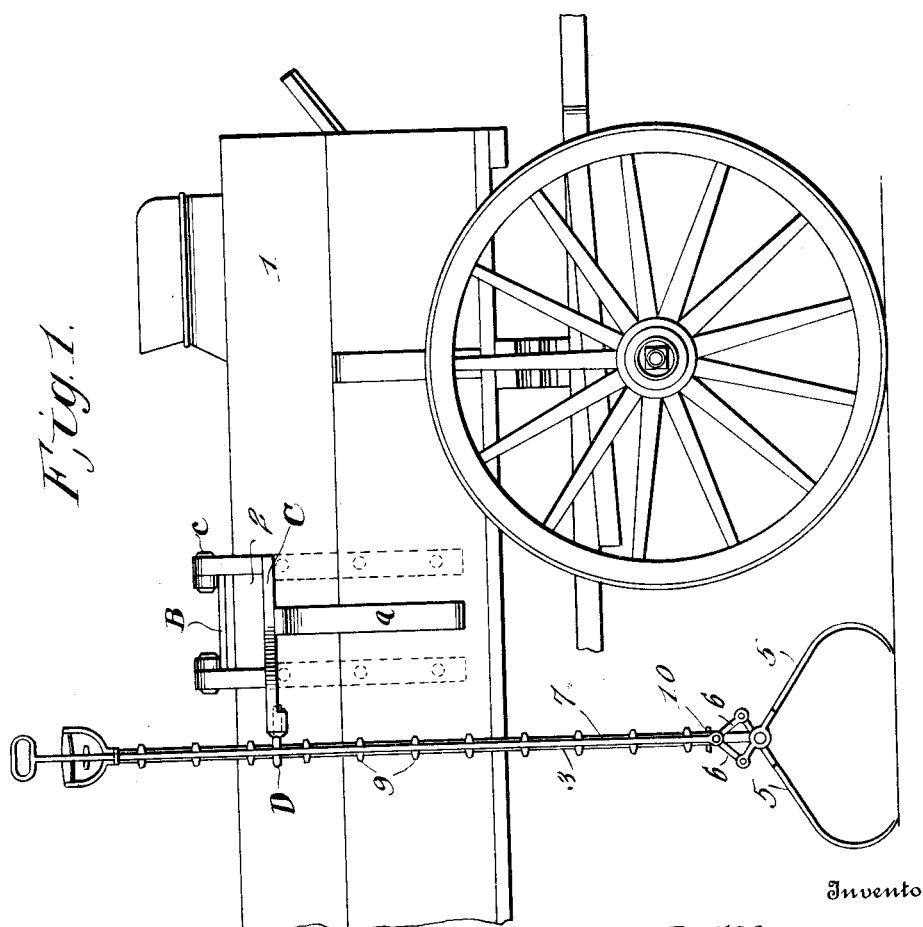
Witnesses
Frank Hough
U. B. Hillyard.
Inventor
James P. Attaway,
By Victor J. Evans
Attorney

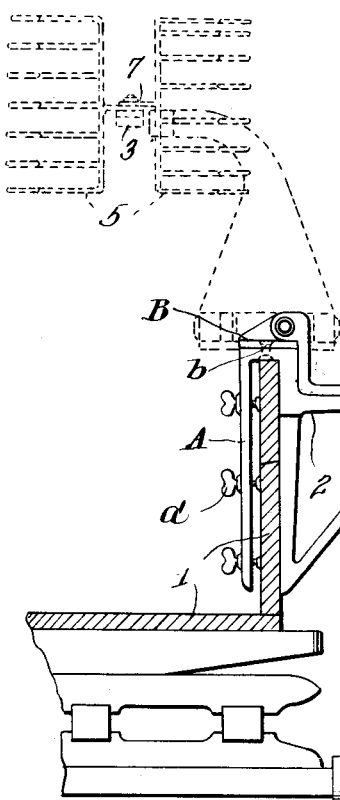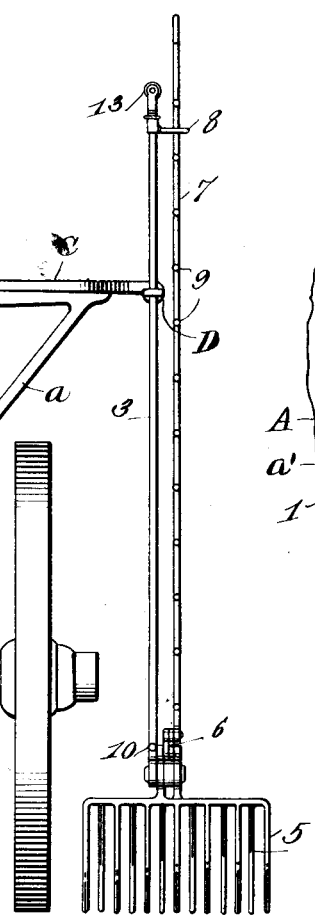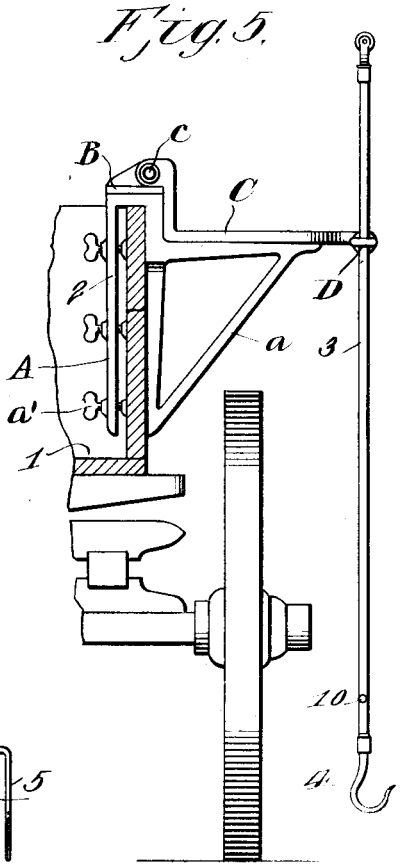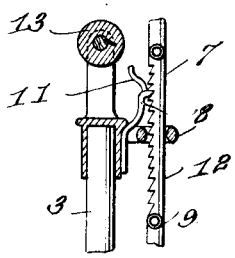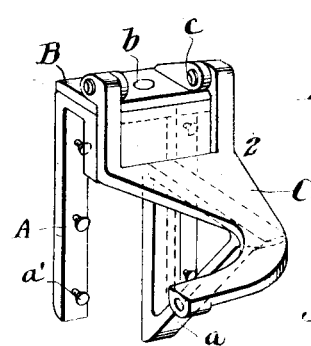

UNITED STATES PATENT OFFICE.

JAMES P. ATTAWAY, OF GRAY COURT, SOUTH CAROLINA.

WAGON-LOADER.

1,066,977.

Specification of Letters Patent.

Patented July 8, 1913.

Application filed November 20, 1912. Serial No. 732,523.

*To all whom it may concern:*

Be it known that I, JAMES P. ATTAWAY, a citizen of the United States, residing at Gray Court, in the county of Laurens and State of South Carolina, have invented new and useful Improvements in Wagon-Loaders, of which the following is a specification.

The invention has relation to means whereby a farm wagon may be easily loaded with hay, grain, or produce, of any nature, the operation being capable of being quickly performed by a single person without requiring any assistance.

The invention provides novel means whereby the person is enabled to occupy the wagon and manipulate the loader so as to lift the load from the ground and deposit the same in the wagon, the means being of such construction as to enable the load to be lifted by stages and finally to be swung into the wagon and deposited therein.

The invention consists of a bracket which is hingedly connected to the body or other convenient part of the wagon so as to swing from an approximately horizontal position into an upright position to carry the load from without the wagon to a point within the same for convenience of discharge and distribution.

The invention also provides a lifting device of peculiar formation, the same consisting of a pole or staff provided at intervals with projections to form handholds and a grapple or other load engaging device at the lower end of the pole or staff to pick up the load and deposit it in the wagon.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a farm wagon showing the application of the invention. Fig. 2 is a transverse section of the wagon, showing the loading appliance in elevation, the full lines showing the relation of the parts when the loader is in engagement with the load prior to lifting the same and the dotted lines showing the relation of the parts when the load is deposited in the wagon. Fig. 3 is a detail view, showing more particularly the bracket and the connecting means between it and the wagon body. Fig. 4 is a detail view of the lower portion of a loader of the type embodying a grapple. Fig. 5 is a modified form of loader, showing a hook at the lower end of the pole or staff. Fig. 6 is a detail view of the upper ends of the pole and operating rod showing the means for holding them in fixed position when the load is gripped between the members of the grapple.

Corresponding and like parts are referred to in the following description, and indicated in all the views of the drawings, by the same reference characters.

It is to be understood that the invention is not restricted as to use although shown in connection with a farm wagon, such illustration being selected because the invention is most especially adapted for agricultural districts for loading hay, grain and produce into a farm wagon.

The numeral 1 designates a farm wagon of any make or variety, the same being provided with one or more brackets 2 which are hingedly connected thereto so as to swing from an approximately horizontal position into a substantially vertical upright position so as to carry the load to a convenient point for discharge within the wagon body. The bracket 2 is of substantial construction and is arranged to occupy an approximately horizontal position and may project laterally from the wagon body to a distance of two to four feet more or less. It is to be understood that the wagon may be equipped with one or more brackets and that the same are arranged in the length thereof to obtain the best results so as to facilitate the work of loading.

The bracket consists of an attaching member A having an outer extension $a$, a plate B connected to the upper end of the member A by means of a pivot fastening $b$, and a swinging member C which is connected to ears of the plate B by means of pintles $c$.

A coupling D is mounted in an arm of the member C so as to turn therein. The staff of the loader is mounted in the outer end of the coupling D so as to move freely therein. The member A of the bracket is adapted to be secured to a side of the wagon body by suitable fastening means, such as thumb screws $a'$. The extension $x$ projects outwardly from the member A and forms a rest or support for the swinging member C when the latter occupies an approximately horizontal position. The member C is adapted to be swung into an approximately vertical position and to be turned about a vertical axis represented by a pivot fastening $b$ so as to occupy the position about as shown by the dotted lines in Fig. 2, thereby enabling the loader to be turned lengthwise or to any angular position with reference to the length of the wagon body.

The loader comprises a pole or staff 3 which may be of any length. A load engaging device is fitted to the lower end of the pole or staff and may be of any construction best adapted to the particular use for which the device is specifically designed. In the preferred construction the load engaging device consists of a grapple but as shown in the modification in Fig. 5 it may consist of a hook 4 to engage the handle of a basket or the bail of a bucket or other receptacle containing the load to be elevated to and deposited within the body of the wagon. The grapple consists of two similar members 5 which are pivotally connected to the lower end of the pole or staff 3, said members having portions extending beyond their pivot point and connected by means of links 6 to the lower end of an operating rod 7 which is slidably mounted in guides or keepers 8 provided in the length of the pole or staff 3. A pull upon the operating rod 7 closes the members of the grapple so as to grip the load between them. A push downward upon the operating rod opens the members of the grapple to admit of the load being received between them. The operating rod 7 is provided at intervals in its length with projections 9 which form handholds to prevent possible slipping when lifting the loader to elevate the load.

In the event of the load being in the nature of a shock, bundle or sheaf of hay, straw, or grain the same is gripped between the members of the grapple by manipulating the operating rod 7 in the manner stated. It is to be understood that the wagon is driven to a convenient point along side of the load. After the grapple has been engaged with the load the pole or staff is fitted to the outer end of the bracket 2 which forms a support therefor. The load is lifted by a hand-over-hand movement in pulling upward upon the pole and operating rod of the loader, the pole sliding upon the outer end of the bracket. When a stop 10 at the lower end of the pole or staff engages the outer end of the bracket a continued upward pull causes the bracket to swing from an approximately horizontal position to an upright position, thence over the body or bed of the wagon carrying the load to a convenient position for discharge into the wagon, the delivery being effected by a downward pressure upon the operating rod 7 which causes the members of the grapple to open and release the load. In the event of the load being of a nature to be received in a basket or other receptacle the loader is of the form shown in Fig. 5, the hook 4 thereof being engaged with a convenient part of the receptacle to cause the same to be elevated when drawing upward upon the pole or staff.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

When the members of the grapple are closed upon the load they are held against opening by means of a catch 11 and a plurality of teeth 12. The catch is carried by the pole 3 and its end extends close to the handle 13 so that a finger of the hand grasping the handle 13 may engage the catch and release it and the load when it is required to dump the latter.

Having thus described the invention what is claimed as new, is:—

1. In a loading appliance a bracket comprising a member to be attached to the wagon body, a swinging member adapted to form a direct support for the loader, and an intermediate connecting member having the swinging member attached thereto and pivotally connected to the attaching member to turn about a vertical axis.

2. A loading appliance comprising an attaching member to be secured to the wagon body and having an outer extension, a second member connected to the attaching member by means of a vertically arranged pivot fastening, and a swinging member pivotally connected to the before mentioned second member and adapted to be supported by the extension of the attaching member, said swinging member forming a direct support for the loading device.

3. A loading appliance comprising a member arranged and supported to turn about a horizontal and a vertical axis, a coupling mounted in the outer end of said swinging member to turn freely about a longitudinal axis, and a loader comprising a pole mounted in the said coupling to move freely therein.

In testimony whereof I affix my signature in presence of two witnesses.

JAMES P. ATTAWAY.

Witnesses:
 L. C. DORROH.
 FESTUS T. CURRY.